March 17, 1959  D. O. BENSON ET AL  2,877,619
CENTRIFUGAL CUTTER ASSEMBLY
Filed May 9, 1955
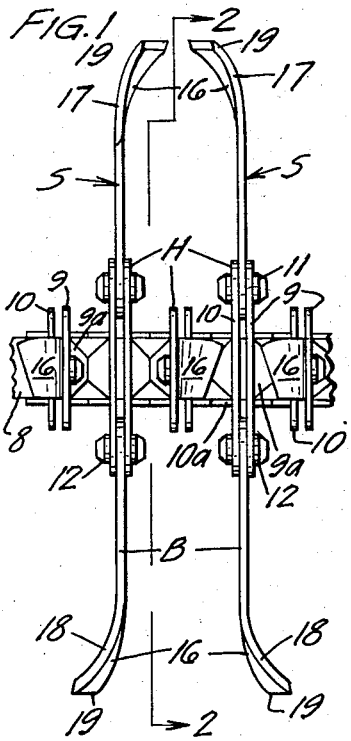
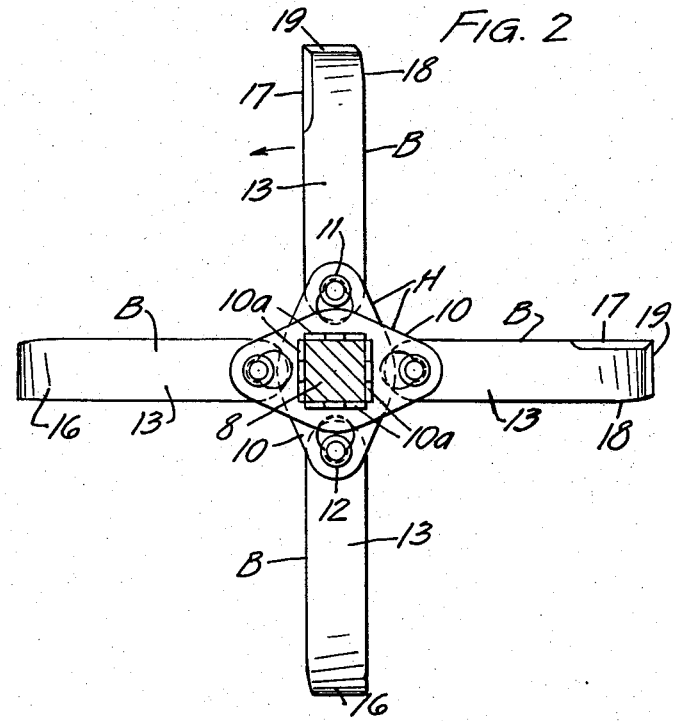
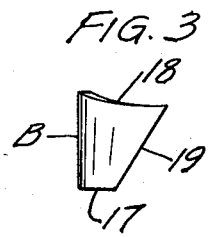
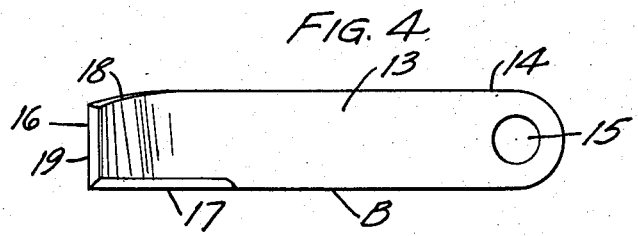
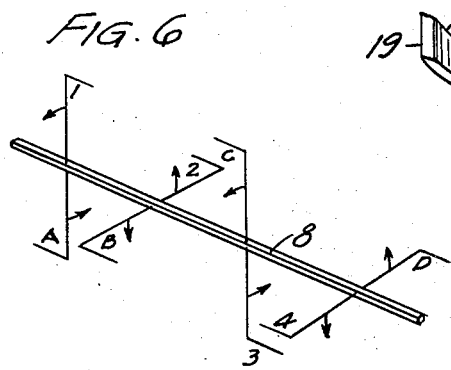
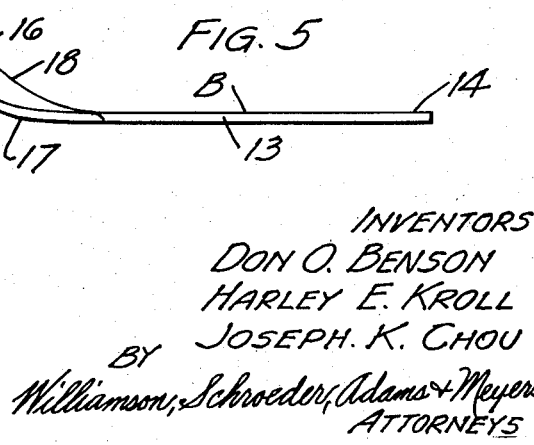
INVENTORS
DON O. BENSON
HARLEY E. KROLL
JOSEPH K. CHOU
BY Williamson, Schroeder, Adams + Meyers
ATTORNEYS United States Patent Office 2,877,619
Patented Mar. 17, 1959

2,877,619

CENTRIFUGAL CUTTER ASSEMBLY

Don O. Benson, Minneapolis, Harley E. Kroll, Hopkins, and Joseph K. Chou, Minneapolis, Minn., assignors to Toro Manufacturing Corporation of Minnesota, Minneapolis, Minn., a corporation of Minnesota Application May 9, 1955, Serial No. 506,984

15 Claims. (Cl. 56—295)

This invention relates to centrifugal cutter assemblies. More particularly, it relates to rotary blades of a particular construction and a novel arrangement of the same to provide an improved centrifugal cutter assembly.

Various centrifugal cutter assemblies utilizing radially extending cutter blades have been designed for cutting grass, weeds and even plants having heavy stalks, such as small trees and shrubs. These assemblies, however, have had certain disadvantages in that the resulting cut surface is often uneven because of an inefficient cutting action. Part of such ineffective cutting action results from the fact that no positive shearing action between two pieces of metal is provided or that the cutting edge is not arranged so that it is equidistant at all points along its length from the axis of rotation. Part results from difficulty in getting the blades to free themselves of the cut grass or foliage sufficiently well to properly perform their cutting functions. In blades previously known, if the cutting edge were disposed equidistantly throughout from the axis of rotation, then grass and foliage would tend to mat and harden upon the laterally extending portions of such blades until they soon function more as dull flails rather than effective cutting devices. Our invention is directed toward eliminating these disadvantages.

It is a general object of our invention to provide a novel and improved centrifugal cutter assembly of simple and inexpensive construction and operation.

A more specific object is to provide a novel and improved centrifugal cutter assembly very simple in construction and arrangement and having increased cutting effectiveness.

Another object is to provide a novel centrifugal cutter assembly, the rotary blades of which are pivotally mounted for rotation and are constructed and arranged in a novel manner relative to each other to provide more effective and efficient cutting action.

Another object is to provide a novel centrifugal cutter assembly, the blades of which are arranged and constructed to cut a wider swath and to cut more effectively because of their design.

Another object is to provide an improved centrifugal cutter assembly, the blades of which are arranged and constructed to create while being rotated an oscillatory lateral or transverse circulation of air and/or cut material within the arc of their rotation.

Another object is to provide an improved centrifugal cutter assembly, the blades of which are arranged and constructed to provide an effective mulching as well as a cutting action without any necessary cooperation with an adjacent housing.

Another object is to provide a novel centrifugal cutter assembly, the blades of which are arranged and constructed to provide improved balance of the assembly during its rotation.

Another object is to provide a novel and improved centrifugal blade constructed to free itself during its rotation of cut material in an improved manner.

Another object is to provide a novel and improved rotary blade constructed to provide a more efficient cutting action when rotated.

These and other objects and advantages of the invention will more fully appear from the following description made in connection with the accompanying drawings, wherein like reference characters refer to the same or similar parts throughout the several views, and in which:

Fig. 1 is a front elevational view of a section of a rotary cutter assembly constructed and arranged in accordance with our invention;

Fig. 2 is a vertical sectional view taken along line 2—2 of Fig. 1;

Fig. 3 is an end elevational view of one of our blades of novel design looking at the same with its outer end portion toward the viewer;

Fig. 4 is an enlarged side elevational view of one of our blades of novel design with the laterally extending outer end portion extending toward the viewer;

Fig. 5 is an edge elevational view of one of our blades of novel design with the leading edge toward the viewer; and Fig. 6 is a diagrammatic view of our novel rotary cutter assembly showing the relation between the adjacent and succeeding blades.

One embodiment of our invention is shown in Figs. 1–6 and may include a centrifugal cutter assembly indicated generally as S, as shown in Figs. 1 and 2. This centrifugal cutter assembly preferably has a rotor in the form of a shaft 8 extending transversely of the machine upon which the centrifugal cutter assembly is to be mounted such as a lawn or grass cutter. As shown, mounted on the shaft 8 in adjacent relation is a plurality of blade hangers indicated generally as H. These blade hangers are comprised of a pair of plate members 9 and 10, the central portions of which are cut and bent laterally to form spacer elements 9a and 10a respectively. These spacer elements extend laterally of the general plane of the plates 9 and 10 and, as clearly shown in Fig. 1, pairs of the plates are arranged on the shaft so that their respective spacer elements extend in opposite directions so as to cooperate with the outwardly extending spacer elements of adjacent pairs of plates to hold the pairs of plates H in the desired spaced relation taken longitudinally of the shaft 8. In addition to serving to space the plates H as desired, these spacer elements also prevent rocking of the plates 9 and 10 by bearing against the sides of the shaft 8. The opening defined by these spacer elements in each of the plates 9 and 10 and others made similarly, is square in shape and of the same size as the shaft 8 so as to snugly fit on the shaft.

Each of the plates 9 and 10, and the others constructed similarly, have elongated slots formed in their outer end portions with restricted medial portions, as best shown in Fig. 2. Pivot pins such as 11 and 12 having a nonrestricted medial portion and a pair of spaced grooves formed therein serve to mount the rotary blades indicated generally as B on the pairs of plates H, as best shown in Figs. 1 and 2, the blades B being carried by the unrestricted medial portion of the pivot pin and the grooves of the pivot pin riding in the outer portions of the slots of the hangers H. It will be noted that the outer portions of these slots are of smaller diameter than the inner portions of the slot and are equal in diameter to the diameter of the grooved portions of the pivot pins. Thus a pivot pin such as 11 may be inserted into the opening of the end portion of one of the blades B and then passed between two of the plates H and inserted into the larger portion of their slots until the grooves of the pivot pin are aligned with the blade hangers and then drawn outwardly so that the grooved portion of the pivot pin fits into the slot. This method of mounting is not a part of the invention and therefore need not be described in greater detail.

Each of the blades B is comprised of a shank 13 having an end portion 14 with an opening 15 formed therethrough to adapt the same to be mounted on one of the pivot pins 11 or 12. The shank 13 is preferably of a plate metal material and has an outer end portion 16 which is curved laterally relative to the general plane of the blade B, as best shown in Figs. 1, 3, 4 and 5. The outer end portion 16 has a sharpened leading edge 17 and a trailing edge 18 and a sharpened outer end edge 19. The trailing edge 18, as best shown in Fig. 3, is longer than the leading edge 17. The end edge 19 is of sweep-back design in that it extends rearwardly and laterally from the outer end of the leading edge 17, as best shown in Fig. 3. This end edge 19 also extends normally to the longitudinal plane of the blade. In other words, if the blade is stood in vertical position with its end edge 19 upon a flat surface, the end edge 19 will touch the flat surface along its entire length. The radius of curvature of the leading edge 17 is less than that of the trailing edge 18.

Referring now to Fig. 6, there is diagrammatically shown the novel arrangement of the blades of our centrifugal cutter assembly. It will be noted that the blades are mounted on the shaft in pairs at spaced points along the length of the shaft 8 so that they extend in a diametrically opposite radial direction during their rotation. It will also be noted that their laterally extending portions extend in opposite lateral directions. This arrangement is shown by the pairs of blades A and 1, B and 2, C and 3, D and 4.

It will also be noted by reference to Fig. 6 that each of the blades has its laterally extending portion extending in a direction laterally of the general plane of the blade opposite to the direction in which the laterally extending portion of its immediately preceding and adjacent blade. In other words, the laterally extending portion of blade 2 extends in a direction opposite to the laterally extending portion of the blade 1 which immediately precedes it as shown by the arrows showing the direction of rotation in Fig. 6. Similarly, the laterally extending portion of the blade B extends in a direction opposite to the direction of the laterally extending portion of the blade C and the corresponding blades are similarly arranged. It will be noted that blade 1 precedes blade 2 which precedes blade 3, etc., and blade A precedes blade B which precedes blade C, etc. The blades 1 and 2 constitute overlapping pairs of successive blades as do blades 3 and 4, and B and C. It will be noted that the laterally extending portion of blade 1 cooperates with the laterally extending portion of blade 2 in an overlapping relation to insure an even cut of the surface to be mowed and the laterally extending portion of blade B overlaps the path of the laterally extending portion of blade C. In a similar manner blade 4 overlaps blade 3.

In operation, the leading edge 17 and the sharpened end edge 19 both serve to cut the grass and foliage. Because they overlap the cutting edges of adjacent blades, substantially a smooth and even cut surface results. They are rotated at relatively high speeds with the result that a quick slicing action produces an efficient cut. Since the end edges 19 are equidistant at all points along their length from the axis of rotation, there is provided a cylindrical envelope of cutting action in contrast to a grooved or threaded envelope of cutting action which would be provided if the end edges 19 were not so disposed.

It will be noted that because of the shape of the outer end cutting portion 16 of the blade, an improved cleaning function results, for the cut material will not tend to mat upon the end portions of the blade which are curved at a different radius. The sweep-back design also facilitates the self-cleaning action of the blade. We have found that a blade constructed in accordance with the disclosure herein functions in a highly improved manner and for practical purposes effectively eliminates the tendency for cut material to mat upon the blades.

Because of the arrangement of the successive blades wherein their laterally extending portions extend in opposite directions, there is induced in the cut material and in the air within the arc of rotation of the blades a cross-circulation and turbulence which tends to buffet the blades of grass, both cut and uncut, laterally. In other words, after a blade passes through the uncut grass, the blades which remain uncut will be found leaning toward and into the path of the next adjacent blade to provide a more efficient cutting action, for it is well recognized that the sharper the angle at which the material to be cut extends relative to the cutting edge, the more efficient cutting action results. In addition the cut material is thrown somewhat laterally and into the path of the next blade so that a fairly effective job of comminution results without any cooperation of a housing being required.

It will also be noted that because of the sweep-back arrangement of the laterally extending portions of the blades B, a much wider cutting surface results than would result from the use of blades constructed as heretofore known. In this manner our device provides a more efficient and effective cutting action.

It will be noted also that the adjacent pairs of blades are arranged at right angles to each other. This gives a much better balance to the rotary cutter assembly as a unit for the weight of blade A and its supporting hangers H counteracts the weight of the corresponding structure with respect to blade 1. In a similar manner the weight of blade B counteracts the weight of blade 2 and since these blades extend at right angles to blades 1 and A, the net result is a well balanced unit.

It will, of course, be understood that various changes may be made in the form, details, arrangement and proportions of the various parts without departing from the scope of our invention.

What is claimed is:

1. A rotary cutter assembly comprising a rotor adapted to be mounted for rotation about its longitudinal axis, and a plurality of radially extending blades pivotally mounted on said rotor for rotation therewith and spaced longitudinally thereof, said blades having leading and trailing edges and having their leading edges sharpened and having outer end portions extending laterally of their general planes, the laterally extending portion of one of said blades extending in the opposite direction to that of the laterally extending portion of its immediately preceding and adjacent blade, the trailing edge of each of said blades being longer and extending farther laterally than its leading edge, the laterally extending portion of each of said blades extending in overlapping relation to the laterally extending portion of an adjacent blade, said blades having laterally extending cutting edges spaced equidistantly from the axis of rotation of said rotor at all points along their length.

2. A rotary cutter assembly comprising a rotor adapted to be mounted for rotation about its longitudinal axis, and a plurality of radially extending blades pivotally mounted on said rotor for rotation therewith and spaced longitudinally thereof, said blades having leading and trailing edges and having sharpened outer end portions extending laterally of their general planes, said sharpened outer end portions including a sharpened leading edge and a sharpened outer end edge, the laterally extending portion of one of said blades extending in the opposite direction to that of the laterally extending portion of its immediately preceding and adjacent blade and in overlapping relation with the laterally extending portion of said adjacent blade, the trailing edge of each of said blades being longer and extending farther laterally than its leading edge the adjacent blades mounted on said rotor being spaced circumferentially relative to said rotor, the laterally extending portions of said blades being curved about the longitudinal axis of said blades to create an oscillatory lateral circulation of air between adjacent blades when rotated.

3. A rotary grass cutter assembly comprising a rotor adapted to be mounted for rotation about its longitudinal axis, and a plurality of radially extending blades pivotally mounted on said rotor for rotation therewith and spaced longitudinally thereof, said blades having leading and trailing edges and having sharpened outer end portions extending laterally of their general planes, the laterally extending portion of one of said blades extending in the opposite direction to that of the laterally extending portion of its immediately preceding and adjacent blade, the trailing edge of each of said blades being longer and extending farther laterally than its leading edge, said blades having sharpened outer end edges extending at an angle to the general plane of said blade and extending rearwardly from the leading edge of said blade in a sweepback design to cause the same to effectively cut grass or the like during its rotation.

4. A rotary cutter assembly comprising a rotor adapted to be mounted for rotation about its longitudinal axis, and a plurality of radially extending blades pivotally mounted on said rotor for rotation therewith and spaced longitudinally thereof, said blades having leading and trailing edges and having sharpened outer end portions extending laterally of their general planes, the laterally extending portion of one of said blades extending in the opposite direction to that of the laterally extending portion of its immediately preceding and adjacent blade, the trailing edge of each of said blades being longer and extending farther laterally than its leading edge, said blades having sharpened outer end edges extending at an angle to the general plane of said blade.

5. A centrifugal grass cutter assembly comprising a rotor adapted to be mounted for rotation about its longitudinal axis, and a plurality of radially extending blades pivotally mounted on said rotor for rotation therewith and spaced longitudinally thereof, said blades having curved outer end portions extending laterally of their general planes and having leading and trailing edge portions, the laterally extending portion of one of said blades extending in the opposite direction to that of the laterally extending portion of its immediately preceding and adjacent blade, the trailing edge portions of said blades having a greater radius of curvature than the leading edges, said blades having sharpened leading and outer end edges, the latter extending at an angle to the general plane of said blade laterally and rearwardly from the leading edge, whereby the uncut grass in the path of each blade will be inclined at least slightly across the path of the cutting edge of the succeeding adjacent blade to thereby effect a more complete and efficient cutting action.

6. A centrifugal cutter assembly comprising a rotor adapted to be mounted for rotation about its longitudinal axis, circumferentially spaced adjacent pairs of blades pivotally mounted on said rotor at spaced points longitudinally thereof for rotation therewith and extending radially outwardly therefrom during rotation in diametrically opposed directions, the blades of each of said pairs having sharpened outer end portions extending laterally of its general plane in a direction opposite to that of the laterally extending portion of the other blade with which it is paired, said sharpened outer end portions including a sharpened outer edge said blades having leading and trailing edges, the leading edge of each of said blades being sharpened, the trailing edge of each of said blades being longer and extending farther laterally than its leading edge, the laterally extending portion of one of said blades extending in the opposite direction to that of the laterally extending portion of the immediately preceding blade of the adjacent pair of blades, the outer end portions of each of said blades being curved about the longitudinal axis of said blade whereby an oscillatory lateral circulation of air will be created between adjacent blades when rotated.

7. A rotary blade comprising a shank member constructed and arranged to be pivotally mounted on a rotor for rotation about an axis transverse to its length, said shank member having a curved leading and a curved trailing edge and an outer end portion extending laterally of the general plane of said member and having a sharpened outer end edge extending normally to the general plane of said shank member and extending laterally outwardly and rearwardly from the leading edge of said member, said leading edge being sharpened, and said trailing edge being longer than said leading edge.

8. A rotary blade comprising an elongated rigid plate member having one end portion constructed and arranged to be pivotally mounted on a rotor for rotation of said member about an axis transverse to its length, the other end portion of said member being sharpened and extending laterally of the general plane of said plate member and having curved trailing and leading edge areas, the leading edge of said leading edge area being sharpened, the trailing edge areas of said other end portion having a greater radius of curvature than its leading edge areas, said other end portion including a sharpened outer end edge.

9. A rotary blade comprising an elongated rigid plate member having one end portion constructed and arranged to be pivotally mounted on a rotor for rotation of said member about an axis transverse to its length, the other end portion of said member being sharpened and extending laterally of the general plane of said plate member and having a curved trailing edge area, a curved leading edge area and an end edge area, the trailing edge of said other end portion extending farther laterally than its leading edge and its end edge area being sharpened and extending substantially normally to the general plane of said plate member, said leading edge being sharpened, and said trailing edge being longer than said leading edge.

10. A rotary blade comprising a shank member having one end portion constructed and arranged to be pivotally mounted on a rotor for rotation of said member about an axis transverse to its length, the other end portion of said member being sharpened and having curved trailing and leading edge areas and extending laterally of the general plane of said plate member, said other end portion including a sharpened outer end edge, the trailing edge of said other end portion being longer than its leading edge, said trailing edge area being curved about a greater radius than said leading edge area, the leading edge of said leading edge area being sharpened.

11. A rotary blade comprising a rigid shank member having one end portion constructed and arranged to be pivotally mounted on a rotor for rotation of said member about an axis transverse to its length, the other end portion of said member being sharpened and having curved trailing and leading edge areas and extending laterally of the general plane of said plate member, the leading edge of said other end portion being sharpened and the trailing area of said other end portion having a greater radius of curvature than its leading edge area.

12. A rotary blade comprising an elongated rigid plate member having one end portion constructed and arranged to be pivotally mounted on a rotor for rotation of said member about an axis transverse to its length, the other end portion of said member being sharpened and having curved trailing and leading edge areas and being curved laterally of the general plane of said plate member, said other end portion having a sharpened end edge and its trailing edge areas having a greater radius of curvature than its leading edge areas.

13. A rotary blade comprising an elongated rigid plate member having one end portion constructed and arranged to be pivotally mounted on a rotor for rotation of said member about an axis transverse to its length, the other end portion of said member having an outer end edge and having curved trailing and leading edge areas and being curved laterally of the general plane of said plate member, the leading edge areas and the outer end of said other end portion being sharpened, the trailing edge of said plate member being longer than the leading edge, said trailing edge area having a greater radius of curvature than the leading edge area of said plate member.

14. A rotary cutter assembly comprising a rotor adapted to be mounted for rotation about its longitudinal axis, and a plurality of radially extending blades pivotally mounted on said rotor for rotation therewith and spaced longitudinally thereof, said blades having leading and trailing edges and having sharpened outer end portions extending laterally of their general planes, the laterally extending portion of one of said blades being curved about the longitudinal axis thereof and extending in the opposite direction to that of the laterally extending portion of its immediately preceding and adjacent blade, the trailing edge of each of said blades being longer and extending farther laterally than its leading edge, each of said blades having a sharpened outer edge area extending normally to the longitudinal plane of said blade.

15. A rotary cutter assembly comprising a rotor adapted to be mounted for rotation about its longitudinal axis, and a plurality of radially extending blades pivotally mounted on said rotor for rotation therewith and spaced longitudinally thereof, said blades having leading and trailing edges and having sharpened outer end portions extending laterally of their general planes, the laterally extending portion of one of said blades extending in the opposite direction to that of the laterally extending portion of its immediately preceding and adjacent blade, the trailing edge of each of said blades being longer and extending farther laterally than its leading edge, each of said blades having a sharpened outer edge area extending normally to the longitudinal plane of said blade and progressing laterally outward from the leading edge toward the trailing edge of said blade.

References Cited in the file of this patent

UNITED STATES PATENTS

| | | |
|---|---|---|
| 783,010 | Beckham | Feb. 21, 1905 |
| 2,506,054 | Agee et al. | May 2, 1950 |
| 2,509,343 | Henderson | May 30, 1950 |
| 2,513,663 | McDaniel | July 4, 1950 |
| 2,517,405 | Moss | Aug. 1, 1950 |
| 2,592,755 | Soenksen | Apr. 15, 1952 |
| 2,666,287 | Attleberry | Jan. 19, 1954 |
| 2,711,067 | Mott | June 21, 1955 |
| 2,721,438 | O'Maley | Oct. 25, 1955 |

FOREIGN PATENTS

| | | |
|---|---|---|
| 356,602 | Great Britain | Sept. 10, 1931 |